United States Patent [19]  
Funabashi et al.

[11] Patent Number: 4,537,259  
[45] Date of Patent: Aug. 27, 1985

[54] BLADE CONTROL DEVICE
[75] Inventors: Tetsuji Funabashi; Shingo Kobayashi, both of Hiratsuka, Japan
[73] Assignee: Kabushiki Kaisha Komatsu Seisakusho, Tokyo, Japan
[21] Appl. No.: 436,841
[22] Filed: Oct. 26, 1982
[30] Foreign Application Priority Data Oct. 26, 1981 [JP] Japan .................................. 56-171064  
Nov. 25, 1981 [JP] Japan .................................. 56-188553  
Nov. 25, 1981 [JP] Japan .................................. 56-188554

[51] Int. Cl.³ ............................ E02F 3/76; E02F 3/85
[52] U.S. Cl. ...................................... 172/4.5; 318/591
[58] Field of Search ................ 172/4, 4.5; 37/DIG. 1, 37/DIG. 20; 404/84; 318/591

[56] References Cited  
U.S. PATENT DOCUMENTS 3,887,012  6/1975  Scholl et al. ........................ 172/4.5  
4,162,708  7/1979  Johnson .............................. 172/4.5  
4,221,266  9/1980  Fardal .................................... 172/4  
4,273,196  6/1981  Etsusaki et al. ..................... 172/4.5  
4,343,365  8/1982  Rajagopal et al. ..................... 172/4

Primary Examiner—Richard T. Stouffer  
Attorney, Agent, or Firm—Spensley Horn Jubas & Lubitz

[57] ABSTRACT

A blade control device comprises a change-over switch for providing light receiving position deviation signal sent out from a light receiving device into a light receiving device control system as a command value, and a device for measuring the change in the height of the light receiving device, whereby a topographic survey is conducted based on the height change of the light receiving device.

The blade control device may further be provided with a second change-over switch for providing the command value outputted from a manual command value setter during a manual operation into the light receiving device control system, whereby returning the blade to a previous position is carried out in accordance with the operation of the second change-over switch.

Further, the blade position can be determined by providing an adder for adding light receiving position deviation and the operation stroke of the lift cylinder at a light receiving time and a detector for detecting the deviation between the added result by the adder and the operation stroke of the lift cylinder at the current time, and by reducing the deviation to zero.

6 Claims, 7 Drawing Figures

BLADE CONTROL DEVICE

BACKGROUND OF THE INVENTION

1. Field of the Invention

The present invention relates to the field of blade control devices of ground leveling machines, such as bulldozers and motor graders.

2. Description of the Prior Art

Ground leveling construction machines equipped with the device for controlling the height of the blade automatically based on the laser beam projected at a specified height above the ground are currently in use.

For performing the ground leveling work using such construction machine, topographic survey is executed before and after the ground leveling. Since a laser leveling (staff) rod, transit, or the like surveying equipment has been used for the topographic survey, a great deal of time and labor has been required.

On the other hand, the vehicle is often obliged to stop running due to increased blade load, while the ground leveling is performed with the level of the blade being controlled. In such case, in the prior art, first the blade load is reduced lifting the blade using a blade height setter, and then the blade is lowered. At this time, since the original blade height can no longer be known, the method involves inconvenience that difference occurs between the ground levels before and after the blade manipulation.

The primary object of the present invention is to provide a blade control device equipped with the topographic survey function capable of performing topographic survey while the aforementioned ground leveling construction machine is run.

To achieve the above object, the present invention uses the deviation in the light (beam) receiving position of the light receiving unit (or the photosensor assembly) as a command value of the light receiving device control system during the topographic survey, and the contour is surveyed by detecting changes in height of the light receiving device which follows the laser beams.

Through such arrangement, topographic survey can be performed simply and efficiently without using special surveying equipment such as the laser staff and transit.

Another object of the present invention is to provide a blade control device capable of returning the blade automatically to the original position, even after the height of the blade is changed manually interrupting said automatic leveling.

To attain this object, the present invention provides two command value setting means in the light receiving device control system which controls the height of the light receiving device, and switch elements which selectively supply command values set by said two command value setting means to said light receiving device control system.

The novel features which are believed to be characteristic of the invention, together with further objects, will be better understood from the following description in connection with accompanying drawings in which presently preferred embodiment of the invention is illustrated by way of example.

DETAILED DESCRIPTION OF THE PREFERRED EMBODIMENT

Figure 1:
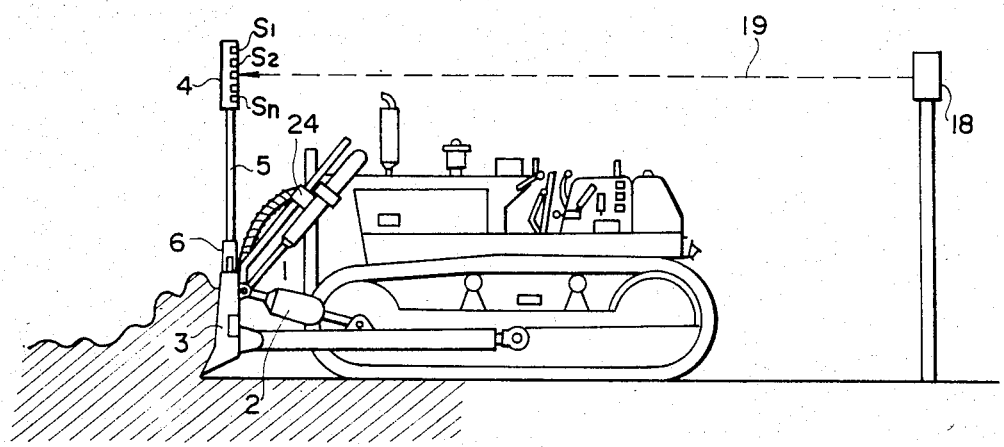
FIG. 1 is a sketch showing an example of the bulldozer.

FIG. 1 shows an example of the bulldozer. A blade 3 of this bulldozer which is lifted and tilted by a lift cylinder 1 and a tilt cylinder 2 is provided with a rod 5 having a light receiving device 4 at its top, and a light receiving device rod up-down mechanism 6 for raising and lowering the rod 5. The mechanism 6 is typically composed of a DC motor and gears, and the light receiving device 4 consists of photosensors S1–Sn arranged vertically. The lift cylinder 1 is provided one on each of the left and right sides of the blade 3.

Figure 2:
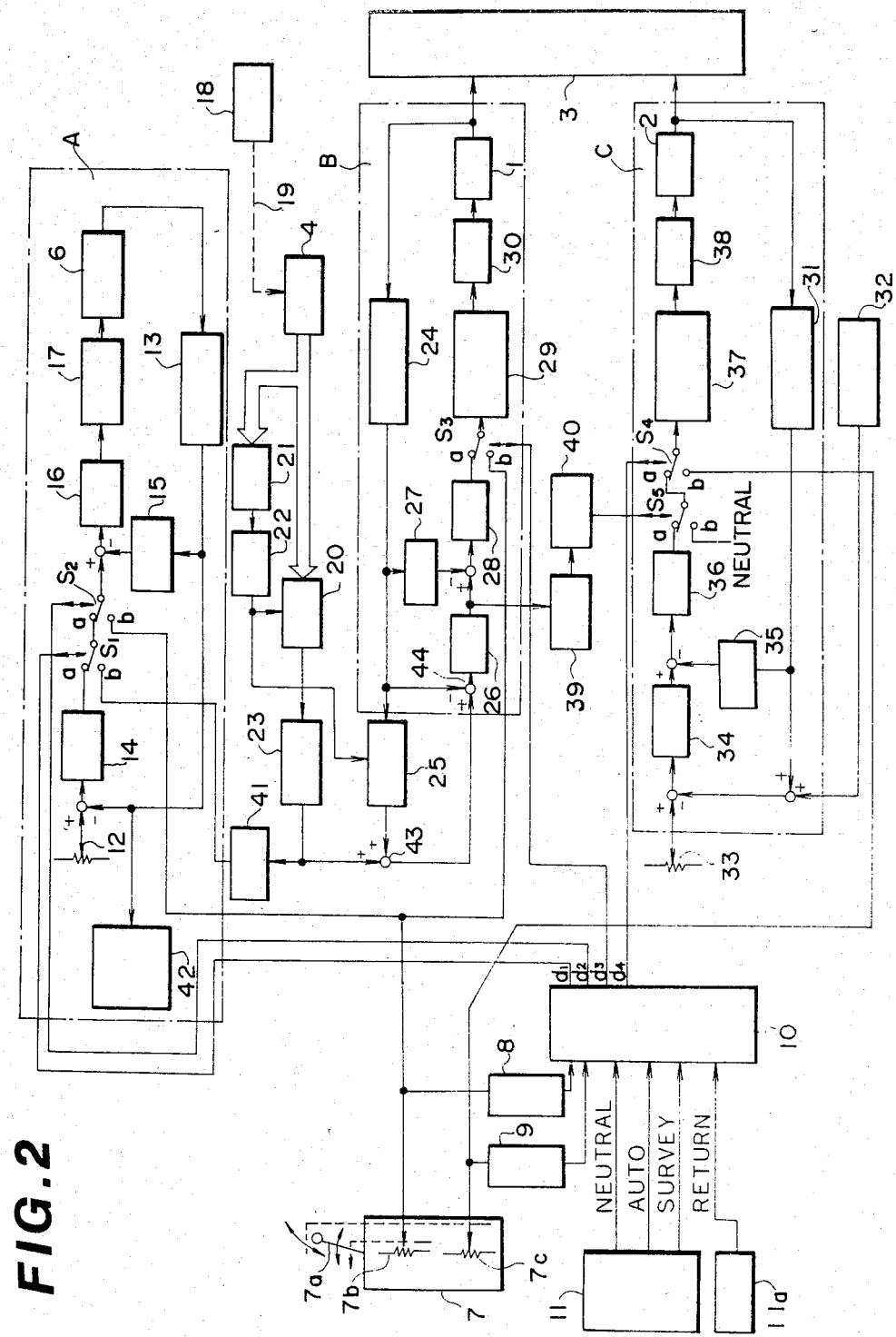
FIG. 2 is a block diagram of a preferred embodiment of the present invention.

FIG. 2 is a block diagram showing an embodiment of the blade control device of the present invention. In FIG. 2, a manual control device 7 is equipped with two potentiometers $7b$ and $7c$ whose output voltages are changed according to the operation of a lever $7a$. The output of the potentiometer $7b$ is fed to a contact b of the switch S3 provided in the later-mentioned lift cylinder control system B, and the contact b of the change-over switch S2 provided in a light receiving device control system A, while the output of the potentiometer $7c$ is fed to the contact b of the change-over switch S4 provided in a tilt cylinder control system C mentioned later.

Window comparators 8 and 9 are for outputting signals whenever plus or minus output voltage of the potentiometer $7b$ or $7c$ has exceeded a specified threshold value, these output signals setting the output signals d2 and d4 of a control mode switching section 10 to "1", and causing the change-over switch S2 of the later-mentioned light receiving device control system A and the change-over switch S4 of the tilt cylinder control system C to close via the contact b.

A mode selector switch 11 is for the selection of the manual mode, automatic mode, or survey mode, and through the switching operation logic levels of output signals d1–d4 of the control mode switching section 10 are set as the following Table 1.

TABLE 1

|  | d1 | d2 | d3 | d4 |
|---|---|---|---|---|
| Manual mode | X | X | 1 | 1 |
| Automatic mode | 0 | 0 | 0 | 0 |
| Survey mode | 1 | 0 | 1 | 0 |

The output signals d1–d4 close the contacts a of the corresponding switch S1–S4 when the logic level is "0", and close the contact b of each switch when the logic level is "1".

Figure 3:
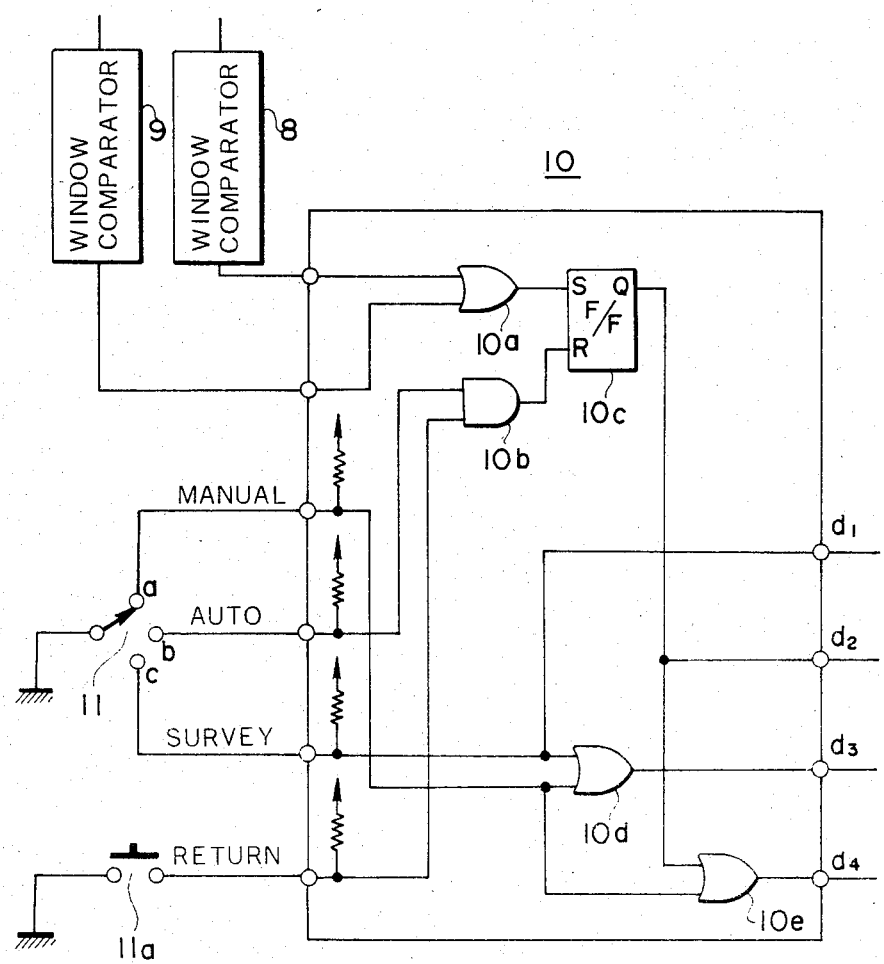
FIG. 3 is a circuit diagram illustrating a typical configuration of the control mode switching section shown in FIG. 2.

The control mode switching section 10 comprises, as shown in FIG. 3, or OR circuit $10a$ for receiving output signals of the window comparators 8 and 9, an AND circuit 10b for outputting logic signal "1" signal when the contact b of the mode selector switch 11 is opened and a later-mentioned return switch 11a is opened, a flip-flop 10c which is set on output signal "1" of the OR circuit 10a and reset on output signals of the AND circuit 10b, an OR circuit 10d arranged to output signal "1" when the contact a or c of the selector switch 11 is opened, and an OR circuit 10e which outputs signal "1" when the flip-flop 10c is set or the contact a of the selector switch 11 is opened.

As shown in FIG. 2, when the change-over switches S1 and S2 are made via the contact a, the difference between the set value of a lift level setter 12 and the output signal of a stroke detector 13 for detecting the stroke of the rod 5 shown in FIG. 1 is fed to an error amplifier 14, and the difference between the output signal of the error amplifier 14 and the output signal of a differentiator 15 for differentiating the output of the stroke detector 13 is fed to the light receiving device rod up-down mechanism 6. Connected to the detector 13 is an indicator (display unit) 42 for measuring the stroke detected by the stroke detector 13 of the light receiving device rod 5, i.e., the change in the height of the light receiving device 4, for monitoring the stroke.

The light receiving device 4 is for detecting the change in the light receiving position with respect to a laser beam 19 projected from a projector 18 shown in FIG. 1, upon the reception of the beam. Now, when any of the sensor S1-Sn of the light receiving device 4 senses the laser beam 19, the output signal of that sensor is fed to a latch circuit 20, and since latch clock is also fed to the latch circuit 20 through an OR circuit 21, which receives the photosensor output, and an one-shot multi circuit 22, the output signal of the photosensor is latched at the latch circuit 20.

The output of each sensor S1-Sn is weighted to a predetermined extent (this weighting represents the deviation of the light receiving position from the optical axis of the laser beam 19 (deviation of the light receiving device center from the optical axis)), and a D/A converter 23 converts the output signal of the latch circuit to an analog voltage based on this weighting. Accordingly, the output signal of the D/A converter 23 shows the extent of the deviation (light receiving position deviation) of the center position of the light receiving device from the laser beam 19. The polarity of the deviation signal reversed according to whether the center position is shifted upward from the laser beam 19 or downward from the beam 19.

The projector 18 turns at a predetermined number of revolutions per minute (rpm), and forms a reference plane with respect to the finish plane (level). When this projector turns at a rate of, for example, 600 rpm, the light receiving device 4 would detects the laser beam every 0.1 second.

The lift cylinder control system B is arranged so as to control the lift cylinder 1 by a series of operations in the case when the change-over switch S3 makes the circuit through the contact a; first the output value of the D/A converter 23 and the detected value of a potentiometer 24 for detecting the stroke value of the lift cylinder 1 are added; the difference between the result of the above addition and the detected value of the potentiometer 24 is fed to an error amplifier 28; and a value locating servo system 29 and a main valve 30 are actuated by the output valve of the amplifier 28.

The output end of the D/A converter 23 is connected with the contact b of the change-over switch S1 of the light receiving device control system A. The sample hold circuit 25 holds by the output signal of the one-shot multi circuit 22.

When the change-over switches S4 and S5 are made via the contact a, the tilt cylinder control system C controls the tilt cylinder 2 by series of operations; the detected value of a stroke detector 31 (detecting by the difference in stroke between the left and right cylinders) for detecting the stroke of the tilt cylinder 2 and the detected value of a car body roll angle clinometer 32 attached to the car body of the bulldozer are added; the sum and the deviation from the setpoint of the tilt setter 33 are fed to an error amplifier 34; and a valve locating servo system 37 and a main valve 38 are actuated by the output value of the amplifier 34 and the output value of the detector 31 is differentiated by a differentiator 35.

An absolute value amplifier 39 which receives the output value of the amplifier 26 of the lift cylinder control system B is for outputting the absolute value of the output value of the amplifier 26. The output of this absolute value amplifier 39 is fed to a known pulse width modulator 40, and converted to a pulse signal of the time width corresponding to that value. When the output value of the absolute value amplifier 39 is zero, the modulator 40 sets the change-over switch S5 to the contact a. When said output value is larger than zero, the contact b of the switch S5 is energized for the duration corresponding to the value exceeding zero. As a result, the lifting of the blade 3 by the control system B is performed in preference to the tilting of the blade 3 by the control system C. This is the control required to cause hydraulic circuit to perform the lift operation preferentially.

Figure 4:
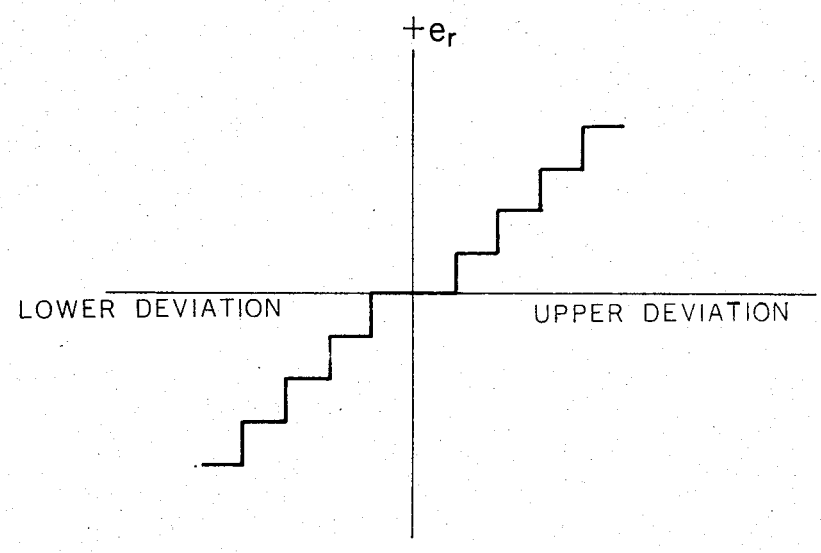
FIG. 4 shows an electric signal corresponding to the difference in the light receiving position of the light receiving device (photosensor assembly)

When the lift level setter 12 of the light receiving device is set properly, the rod 5 of the light receiving device 4 is extended or contracted until it gains the stroke corresponding to the set value. As a result, the center position of the light receiving device 4 departs from the optical axis of the laser beam 19 (light receiving position deviation). In this case, when the laser beam is above the light receiving device center (upper deviation), a positive voltage $e_r$ corresponding to the amount of deviation is output from the D/A converter 23, while when the laser beam is under the light receiving device center, a negative voltage $e_r$ is output from the D/A converter, as shown in FIG. 4. Accordingly, the lift cylinder control system B controls the lift cylinder 1 so as to cancel the light receiving position deviation (offset), i.e., to bring the central part of the light receiving device 4 to coincide with the optical axis of the laser beam 19. As a result, the blade 3 is brought to the level corresponding to the setpoint of the lift level setter 12.

On the other hand, since the tilt cylinder control system C is also a servo system, the tilt cylinder 2 tilts the blade 3 until it is brought to a tilt angle corresponding to the set value of the tilt setter 33.

The operation of each control system when the mode selector switch 11 is set to "AUTO", i.e., when all of the output signals d1-d4 of the control mode switching section 10 are set to "0" and all change-over switches S1-S4 are closed via contacts a has so far been described. Now, the operation when the "SURVEY" mode is selected by the selector switch 11 will be described.

In this case, since the logic levels of the output signals d1, d2, d3, and d4 of the control mode switching unit 10 are set to "1", "0", "1", and "0", respectively as described above, the change-over switches S1 and S3 are closed via the contact b, and the change-over switches S2 and S4 are closed via the contacts a. As a result, the the light receiving device control system A forms a speed servo control system which takes the output value of the D/A converter 23 as a command value, while the lift cylinder control system B becomes such that the feedback loop is broken, and the potentiometer 7b of the manual control device 7 is ready to input the control signal for the lift cylinder 1. The tilt cylinder control system C functions as in the case of the above "AUTO" mode.

Now, if the blade 3 is horizontally positioned through the manipulation of the tilt setter 33, and the vehicle is run with the blade held at a proper level through the operation of the lift potentiometer 7b of the manual control device 7, the height of the light receiving device 4 would change according to the irregularity (rise and fall) of the ground surface as follows.

That is, when the laser beam 19 is projected over the center of the light receiving device 4 as the vehicle runs over a concave of the ground, a positive voltage er shown in FIG. 4 is output from the D/A converter 23, and the DC motor of the rod up/down mechanism 6 runs toward the direction extending the light receiving device rod 5. On the other hand, the laser beam 19 is projected under the center of the light receiving device 4, a negative voltage er shown in FIG. 4 is output from the D/A converter 23, and the DC motor runs toward the direction contracting the rod 5.

In this manner, the light receiving device 4 moves to follow the laser beam 19 so as to receive the beam 19 at its center. Hence, by recording the rod stroke output from the stroke detector 13 of the light receiving device rod to the stroke display (indicator) unit 42, topographic survey with reference to the optical axis of the laser beam 19 can be made.

When the vehicle travelling ground irregularity is too great for the light receiving device 4 to follow the laser beam 19, it is expendient that the level of the blade 3 is adjusted by positioning the rod 5 installed to the light receiving device 4 to the center of its movable stroke through the manipulation of the lift potentiometer 7b of the manual control device 7. In such case, it is required that the amount of up or down of the blade 3 is measured by a meter or the like, and the data obtained is added to or subtracted from the subsequent survey result.

If, for example, a pen recorder is used as the indicator 42, the distance of the ground concave (or convex) from the start point would not be found unless the bulldozer is run at a fixed (uniform) speed. Accordingly, it is preferable to provide to the indicator unit means to measure the distance from the survey start point. That is, it is preferable to cause the ground concave (or convex) to be measured and indicated detecting the stroke change of the stroke detector 13 corresponding to the above distance, in addition to the verification of the ground concave (or convex).

Now, the manual operations of the lift cylinder 1 and the tilt cylinder 2 will be described. It is frequently the case that when the ground leveling is performed with the mode selector switch 11 in "AUTO", the vehicle is caused to stop running due to overload of the blade 3. Such problem may be solved by moving the blade 3 upward through the changing of the set value of the lift level setter 12 of the light receiving device control system A. Doing so, however, makes difficult returning the edge of the blade 3 to the original position, since the original set value of the lift level setter is not known any longer.

With the device shown in the above embodiment, manual blade lift and tilt controls can be performed without the occurrence of such inconvenience. Since the output voltage of the potentiometer 7b actuates the window comparator 8, as the lever 7a of the manual control device 7 is manipulated in the lift axial direction, the output signal d2 of the control mode switching unit 10, which has so far been logic level "0", is changed to "1", and as a result the change-over switch S2 of the light receiving device control system A is changed to the contact b.

Now, if a negative voltage is being output from the potentiometer 7b, this voltage is fed to the light receiving device control system A as a speed command signal, and the DC motor of the rod driving gear 6 turns toward the direction contracting the light receiving device rod 5. Since, as a result, when the center of the light receiving device 4 falls below the optical axis of the laser beam 19, the lift cylinder control system B controls the lift cylinder 1 so as to lift the blade 3. Then, the output voltage of the potentiometer 7b is zeroed, the contraction of the rod 5 stops, and the lifting of the blade 3 stops at the time when the light receiving device 4 catches the laser beam 10 at its center.

When the return switch 11a provided separate from the mode selector switch 11 is pushed after the blade 3 is lifted by the aforementioned operation, the logic level of the signal d2 of the control mode switching unit 10 returns to "0", and as a result the change-over switch S2 is reset to the contact a. Accordingly, the light receiving device 4 returns to the original level corresponding to the set value of the lift level setter 12, and the blade 3 also returns to the original level following thereto.

The blade 3 can be moved to the reverse direction (down) by operating the potentiometer 7b toward the direction that makes its output voltage positive.

On the other hand, if the tilt potentiometer 7c of the manual control device 7 is manipulated, the output voltage of the potentiometer 7c actuates the window comparator 9, and the output of the comparator 9 in turn sets the logic level of the output signal d4 of the control mode switching unit 4 to "1". As a result, the switch S4 is transferred to the contact b, and the output voltage of the potentiometer 7c is fed as a command value of the tilt potentiometer control system. Accordingly, by changing the output voltage of the potentiometer 7c, any desired blade tilt angle can be set manually. In this case, by setting the logic level of the signal d4 to "0" by pushing the return switch 11a, i.e., by resetting the switch S4 to the terminal a, the tilt angle of the blade 3 can be returned to the original tilt angle.

The level of the blade and the tilt angle can be manually adjusted by setting the mode selector switch 11 to "MANUAL". In this case, since both output signals d3 and d4 of the control mode switching unit 10 are set to the logic level "1", the change-over switches S3 and S4 are made via the contact b. Accordingly, by manipulating the potentiometers 7b and 7c of the manual control device 7, the level and tilt angle of the blade can be set manually.

As described previously, the laser projector 18 generates the reference level (height) for the blade turning at a predetermined speed (rpm). If the laser projector 18 turns at 600 rpm, the light receiving device 4 would detect the laser beam every 0.1 second.

Accordingly, in the case of prior art blade control device (not shown) wherein the output signal of the D/A converter 23 is directly used as a command value of the lift cylinder control system, the command value would intermittently change every 0.1 second.

The fact signifies that even when the actual position of the blade has changed, the command value never changes for a period of 0.1 second.

Consequentially, a problem is involved in the prior art blade control device that the command value for the lift cylinder control system does not change for a period of at least 0.1 second, and the blade makes vertical movement each time the command value changes intermittently.

Now, when the light receiving device 4 receives the laser beam 19, and a sampling signal is output from the one-shot circuit 22, the light receiving position deviation (distance between the beam 19 and the center of the light receiving device) at the time t1 the beam has been received is stored in the latch circuit 20, and converted to an analog value at the D/A converter. In addition, the output of the potentiometer 24 at the time t1 of the reception of the beam is held at the sample hold circuit 25.

Further, the output of the D/A converter and the output of the sample hold circuit 25 are added to an adding point 43, and the resulted sum does not change until time t2 when the light receiving device 4 receives the laser beam 19 after 0.1 second. The difference between the sum resulted at the adding point 43 and the output of the potentiometer 24 is calculated at an adding point 44, and the difference is fed to the lift control system B as a command value therefor. Accordingly, the command value for the lift control system B changes according to the change in the stroke of the lift cylinder 1 even between the times t1 and t2.

Therefore, according to the control device of the present invention, since the command value for the lift control system B continuously changes properly, the blade level control during the period from time t1 to time t2 can be made properly.

Accordingly, blade oscillation caused by the intermittent change of the command value for the lift control system, which is a major drawback of the prior art control device, is eliminated by the control device of the present invention.

For reference, blade lift control will be described in conjunction with FIGS. 5A and 5B.

Figure 5A:
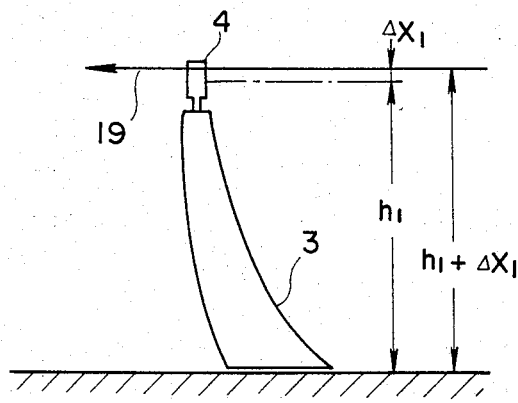
FIGS. 5A, 5B, and 5C show blade movement by way of example.

Now, if, as shown in FIG. 5A, the center of the light receiving device 4 is positioned below the laser beam 19 at a certain sampling time based on the signal output from the one shot circuit 22, the output of the D/A converter at that time is $\Delta X1$, and the output of the sample hold circuit 25 is h1, the sum at the adding point 43 shows $h1+\Delta X1$.

Figure 5B:
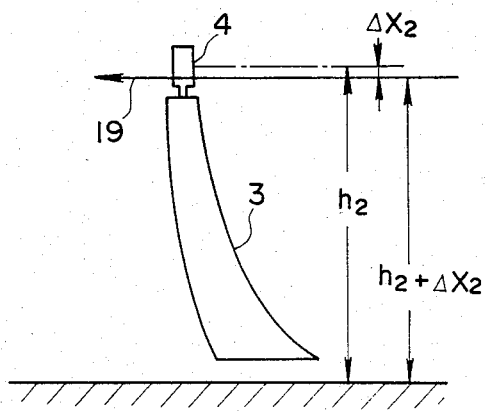

When the center of the light receiving device 4 is positioned above the laser beam 19 at the above sampling time as shown in FIG. 5B, the sum at the adding point 43 represents the distance $h2+\Delta X2$ shown in that figure, since the light receiving device 4 outputs a negative positional deviation.

Figure 5C:
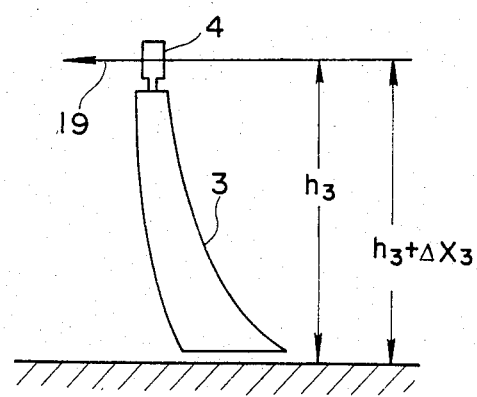

Further, when the laser beam is at the center of the light receiving device 4 as shown in FIG. 5C, the output signal $\Delta X3$ of the light receiving device 4 is zero, and the sum at the adding point 43 represents the distance h3 shown in that figure.

Since the adding point 44 outputs the difference between the sum at the adding point and the output of the potentiometer 24 as a command value for the lift control system B, the lift cylinder 1 is controlled so as to lift the blade 3 by $\Delta X1$ in the case of FIG. 5A, and to lower the blade 3 by $\Delta X2$ in the case of FIG. 5B.

In the case of FIG. 5C, the blade 3 is held at the current position, as might be evident.

What is claimed is:

1. A blade control device comprising:
   a blade,
   a light receiving device mounted to the blade and providing a position deviation signal,
   receiving device control means for lifting and lowering said light receiving device to a height above said blade corresponding to a predetermined command value,
   a lift cylinder control means, operative in an automatic levelling mode and responsive to said position deviation signal from said light receiving device, for lifting or lowering said blade so as to eliminate any deviation in position of said light receiving device with respect to a laser beam projected at a predetermined height above ground and sensed by said light receiving device,
   switching means for selectively inputting said position deviation signal from said light receiving device to said receiving device control means as a command value in lieu of said predetermined command value during operation in a topographic survey mode, in place of inputting said position deviation signal to said lift cylinder control means as is the case during said automatic levelling mode, said lift cylinder control means being free from receiving signals from said light receiving device during said topographic survey mode; and
   height measuring means for measuring the change in height of said light receiving device with respect to said blade in response to said input of said position deviation signal, the resultant measurement of the change in the height providing topographic survey information.

2. A blade control device of claim 1 wherein said receiving device control means comprises a sensor for detecting the vertical position of said light receiving device, the output of said sensor being inputted into said height measuring means.

3. A blade control device for use on a ground leveling machine and utilized with a laser projector turning at predetermined speed, said blade control device including a light receiving device mounted to a blade to receive the laser beam projected by said projector and providing a light receiving position deviation signal, a circuit for latching the light receiving position deviation signal output each time said light receiving device receives said laser beam, a lift cylinder control system for lifting said blade in a manner so as to make the value of the light receiving position deviation signal latched at said latch circuit zero, comprising:
   a sensor for detecting the working stroke of the lift cylinder for lifting said blade and providing an output signal;
   sampling means for sampling and holding the output signal of said sensor, said sampling being synchronized with the latching of said latch circuit;
   adding means to add the signal held by said sampling means and the light receiving position deviation signal latched at said latch circuit; and
   detecting means for detecting the difference between the added result of said adding means and the output signal of said stroke detecting sensor, said lift cylinder control system being operated in response to the difference detected by said first detecting means so as to make the value of the deviation signal zero.

4. A blade control device of claim 3 further including means for differentiating the output signal of said stroke detecting sensor, and the output signal of said differentiating means is used as a speed feedback signal of said lift cylinder control system.

5. A blade control device comprising:
a blade;
a light receiving device mounted to the blade and movable with respect to the blade in vertical directions;
a light receiving device controlling system means for positioning, when in an automatic leveling mode where said blade is automatically controlled using a reference surface formed by a laser beam, said light receiving device to a height above the blade corresponding to a command value,
a lift cylinder control system means, to which there is provided, when in the automatic leveling mode, a deviation signal representative of deviation of light receiving position of said light receiving device with respect to the laser beam projecting at a predetermined height, for lifting or lowering the blade so as to eliminate said deviation;
first switching means for inputting said deviation signal, instead of said command value, to said light receiving device controlling system means during a topographic survey period;
a manual control device for producing a manual control signal which lifts or lowers the blade by a manual operation;
second switching means for inputting said manual control signal, instead of said deviation signal, to said lift cylinder control system means in the topographic survey period, said lift cylinder control system means being free from receiving signals from said light receiving device during said topographic survey period; and
height measuring means for measuring the change in height of said light receiving device.

6. A blade control device comprising:
a blade;
a light receiving device mounted to the blade so as to be movable in vertical directions;
a light receiving device controlling system means for positioning, when in an automatic leveling mode where said blade is automatically controlled using a reference surface formed by a laser beam, said light receiving device to a height corresponding to a command value;
a lift cylinder control system means to which, when in the automatic leveling mode, a deviation signal representative of the deviation of the light receiving position of said light receiving device with respect to the laser beam projecting at a predetermined height is provided, for lifting or lowering the blade so as to eliminate said deviation;
a manual control means for producing a manual control electronic signal output indicative of desired lifting or lowering of the blade in a manual operation; and
switching means for inputting the signal output of said manual control means, instead of said command value, to said light receiving device controlling system means during manual operation, and for inputting said command value to said light receiving device controlling system means during the automatic leveling mode after the manual operation is finished, said lift cylinder control system means being free from receiving signals from said light receiving device during manual operation, and said light receiving device controlling system means being operable by said deviation value to move said light receiving device vertically relative to said blade during said manual operation.

* * * * *